(12) United States Patent
Rajvanshi et al.

(10) Patent No.: US 12,534,097 B1
(45) Date of Patent: Jan. 27, 2026

(54) DRIVER ALERTING AND FEEDBACK

(71) Applicant: Samsara Inc., San Francisco, CA (US)

(72) Inventors: Sarthak Rajvanshi, Brookline, MA (US); William Evan Welbourne, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/051,832

(22) Filed: Nov. 1, 2022

(51) Int. Cl.
*B60W 50/14* (2020.01)
*B60W 40/08* (2012.01)
*B60W 50/00* (2006.01)

(52) U.S. Cl.
CPC .......... *B60W 50/14* (2013.01); *B60W 40/08* (2013.01); *B60W 2050/0028* (2013.01); *B60W 2050/143* (2013.01); *B60W 2050/146* (2013.01); *B60W 2420/403* (2013.01); *B60W 2540/043* (2020.02); *B60W 2556/20* (2020.02); *B60W 2556/45* (2020.02)

(58) Field of Classification Search
CPC ................ B60W 50/14; B60W 40/08; B60W 2540/043; B60W 2556/20; B60W 2556/45; B60W 2050/0028; B60W 2050/143; B60W 2050/146; B60W 2420/403
USPC ...................................................... 340/438
See application file for complete search history.

(56) References Cited

U.S. PATENT DOCUMENTS

| | | | |
|---|---|---|---|
| 4,671,111 A | 6/1987 | Lemelson | |
| 5,825,283 A | 10/1998 | Camhi | |
| 5,917,433 A | 6/1999 | Keillor et al. | |
| 6,064,299 A | 5/2000 | Lesesky et al. | |
| 6,098,048 A | 8/2000 | Dashefsky et al. | |
| 6,157,864 A | 12/2000 | Schwenke et al. | |
| 6,253,129 B1 | 6/2001 | Jenkins et al. | |
| 6,317,668 B1 | 11/2001 | Thibault et al. | |
| 6,411,203 B1 | 6/2002 | Lesesky et al. | |
| 6,421,590 B2 | 7/2002 | Thibault | |
| 6,452,487 B1 | 9/2002 | Krupinski | |
| 6,505,106 B1 | 1/2003 | Lawrence et al. | |

(Continued)

FOREIGN PATENT DOCUMENTS

| CN | 111047179 A | 4/2020 |
|---|---|---|
| DE | 10 2004 015 221 A1 | 10/2005 |

(Continued)

OTHER PUBLICATIONS

U.S. Appl. No. 18/051,835, Adaptive Driver Safety Event Assessment, filed Nov. 1, 2022.

(Continued)

*Primary Examiner* — Naomi J Small
(74) *Attorney, Agent, or Firm* — Knobbe, Martens, Olson & Bear, LLP

(57) ABSTRACT

This disclosure relates to systems, methods, and devices for providing safety event alerts to drivers and for receiving feedback from drivers in real time. A driver safety alerting method can include monitoring, using at least one safety monitoring device, information indicative of driver safety, detecting, using the information indicative of driver safety, a safety event, alerting a driver of the safety event, and receiving, via the at least one safety monitoring device in substantially real time, driver feedback, the driver. Safety event information can be used for training a machine learning model configured to detect safety events.

17 Claims, 8 Drawing Sheets

(56) References Cited

U.S. PATENT DOCUMENTS

| | | |
|---|---|---|
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,127,810 B2 | 11/2018 | Durie, Jr. et al. |
| 10,157,321 B2 | 12/2018 | Becker et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,652,335 B2 | 5/2020 | Botticelli |
| 10,715,976 B2 | 7/2020 | Hoffner et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |

(56) References Cited

U.S. PATENT DOCUMENTS

| | | |
|---|---|---|
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,363,434 B1 * | 6/2022 | Malinowski ..... G08G 1/096791 |
| 11,365,980 B1 | 6/2022 | Akhtar et al. |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsal et al. |
| 11,798,187 B2 | 10/2023 | Zaheer et al. |
| 11,798,298 B2 | 10/2023 | Hassan et al. |
| 11,800,317 B2 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,321,576 B1 | 6/2025 | Browder et al. |
| 12,327,445 B1 | 6/2025 | Eberhardt et al. |
| 12,328,639 B1 | 6/2025 | Smith et al. |
| 12,344,168 B1 | 7/2025 | Wang et al. |
| 12,346,712 B1 | 7/2025 | Eberhardt et al. |
| 12,367,718 B1 | 7/2025 | Calmer et al. |
| 12,368,903 B1 | 7/2025 | Lin et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2011/0284304 A1 * | 11/2011 | Van Schoiack ....... B60W 40/08 180/272 |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |

(56) References Cited

U.S. PATENT DOCUMENTS

| | | |
|---|---|---|
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0126901 A1* | 5/2018 | Levkova ............ B60W 40/09 |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0330610 A1* | 11/2018 | Wu ..................... G08G 1/164 |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0220010 A1* | 7/2019 | Leonard ............... B60W 50/14 |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0164894 A1* | 5/2020 | Yi ...................... B60W 30/18 |
| 2020/0168094 A1 | 5/2020 | Shimodaira et al. |
| 2020/0245115 A1* | 7/2020 | Dorrance ............ G08G 1/0141 |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0006950 A1 | 1/2021 | Hajimiri et al. |
| 2021/0097315 A1 | 4/2021 | Carruthers et al. |
| 2021/0397908 A1 | 12/2021 | ElHattab et al. |
| 2022/0048432 A1* | 2/2022 | Switalski ............. G08G 1/205 |
| 2022/0121867 A1* | 4/2022 | Arar ..................... G06V 10/82 |
| 2022/0165073 A1 | 5/2022 | Shikii et al. |
| 2022/0194385 A1* | 6/2022 | Geissler ............... B60K 35/235 |
| 2022/0289203 A1 | 9/2022 | Makilya et al. |
| 2022/0353276 A1* | 11/2022 | Hegrat ................. G06N 20/00 |
| 2022/0374737 A1 | 11/2022 | Dhara et al. |
| 2022/0396287 A1* | 12/2022 | Akash .................. B60W 50/16 |
| 2023/0077207 A1 | 3/2023 | Hassan et al. |
| 2023/0140079 A1* | 5/2023 | Zhu ..................... G06V 20/58 |
| | | 382/103 |
| 2023/0146426 A1* | 5/2023 | Sanchez ............ G06Q 30/0202 |
| | | 705/7.31 |
| 2023/0153735 A1 | 5/2023 | Dhara et al. |
| 2023/0169420 A1 | 6/2023 | Dhara et al. |
| 2023/0219592 A1 | 7/2023 | Calmer et al. |
| 2023/0281553 A1 | 9/2023 | Singh et al. |
| 2023/0298410 A1 | 9/2023 | Calmer et al. |
| 2023/0300616 A1* | 9/2023 | Petit .................... H04W 12/66 |
| | | 726/22 |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0146629 A1 | 5/2024 | Lloyd |
| 2025/0002033 A1 | 1/2025 | Calmer et al. |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |

(56) References Cited

FOREIGN PATENT DOCUMENTS

| | | |
|---|---|---|
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAlalQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Guide: Drive risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_ 1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

(56) References Cited

OTHER PUBLICATIONS

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.
Brown, P. et al., "AI Dash Cam Benchmarking" [report], Strategy Analytics, Inc., Apr. 15, 2022, in 27 pages.
Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.

(56) References Cited

OTHER PUBLICATIONS gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet Drive Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group Drive Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver Drive Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and Drive Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is Drive Risk Score?", Motive Technologies, Inc., accessed on Oct. 24, 2023 [publication date unknown],

(56) References Cited

OTHER PUBLICATIONS in 5 pages. URL: https://helpcenter.gomotive.com/hc/en-us/articles/6162164321693-What-is-DRIVE-risk-score-.
Motive Help Center, "What is Drive Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score—(filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.
Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.
Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.
Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.
Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.
Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.
Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.
Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.
Motive, "Asset Gateway Installation Guide | Cable/Vehicle Powered" [video], YouTube, Jun. 25, 2020, screenshot in 1 page. URL: https://www.youtube.com/watch?v=pME-VMauQgY.
Motive, "Asset Gateway Installation Guide | Solar Powered" [video], YouTube, Jun. 25, 2020, screenshot in 1 page. URL: https://www.youtube.com/watch?v=jifKM3GT6Bs.
Motive, "Benchmarking AI Accuracy for Driver Safety" [video], YouTube, Apr. 21, 2022, screenshot in 1 page. URL: https://www.youtube.com/watch?v=brRt2h0J80E.
Motive, "CEO Shoaib Makani's email to Motive employees.", Motive Technologies, Inc., Dec. 7, 2022, in 5 pages. URL: https://gomotive.com/blog/shoaib-makanis-message-to-employees/.
Motive, "Coach your drivers using the Motive Safety Hub." [video], YouTube, Mar. 27, 2023, screenshot in 1 page. URL: https://www.youtube.com/watch?v=VeErPXF30js.
Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.
Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.
Motive, "Guide: AI Model Development", Motive Technologies, Inc., accessed on Mar. 29, 2024 [publication date unknown], Document No. 2022Q1_849898994, in 14 pages.
Motive, "Guide: Drive risk score", Motive Technologies, Inc., accessed on Apr. 8, 2023 [publication date unknown], Document No. 2022Q2_849898994, in 22 pages.
Motive, "Guide: Smart Event Thresholds", Motive Technologies, Inc., accessed on Apr. 8, 2023 [publication date unknown], Document No. 2022Q1_902914404, in 11 pages.
Motive, "How to install a Motive Vehicle Gateway in light-duty vehicles." [video], YouTube, Aug. 5, 2022, screenshot in 1 page. URL: https://www.youtube.com/watch?v=WnclRs_cFw0.
Motive, "How to install your Motive AI Dashcam." [video], YouTube, Aug. 5, 2022, screenshot in 1 page. URL: https://www.youtube.com/watch?v=3JNG2h3KnU4.
Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.
Motive, "Improve road and fleet safety with driver scores.", Motive Technologies, Inc., Feb. 7, 2019, in 5 pages. URL: https://gomotive.com/blog/improve-fleet-safety-driver-scores/.
Motive, "Industry-leading fleet management solutions", Motive Technologies, Inc., accessed on Feb. 18, 2024 [publication date unknown], in 13 pages. URL: https://gomotive.com/products/.
Motive, "Introducing an easier way to manage unidentified trips.", Motive Technologies, Inc., Apr. 30, 2020, in 5 pages. URL: https://gomotive.com/blog/introducing-easier-ude-management/.
Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "KeepTruckin ELD Training for Drivers" [video], YouTube, Feb. 2, 2018, screenshot in 1 page. URL: https://www.youtube.com/watch?v=LkJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

(56) References Cited

OTHER PUBLICATIONS

Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://

(56) References Cited

OTHER PUBLICATIONS kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm485564145580163323842 9578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45 Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco:Drive system", Fleet World, 2010, in 3 pages. URL: https://fleetworld.co.uk/fiat-launches-fleet-specific-ecodrive-system/.
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel It, [publication date unknown], in 2 pages.
"FuelOpps™ Version 2.0" [presentation], Propel It, Inc., [publication date unknown], in 17 pages.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

(56) References Cited

OTHER PUBLICATIONS

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Our Products" [archived webpage], Propel It, archived on Aug. 3, 2018, in 2 pages. URL: https://web.archive.org/web/20180803052120/http://www.propelit.net:80/our-products-1.

"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Safetyopps" [archived webpage], Propel It, archived on Nov. 14, 2017, in 3 pages. URL: https://web.archive.org/web/20171114183538/http://www.propelit.net:80/safetyopps2.

"Safetyopps", Propel It, [publication date unknown], in 1 page. (PROPEL-IT-1393_00019).

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"The 2012 Fiat 500: eco:Drive", Fiat500USA.com, Feb. 14, 2011, in 24 pages. URL: http://www.fiat500usa.com/2011/02/2012-fiat-500-ecodrive.html.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutoMotoTV, "Fiat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix® Wingman ® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

FiatFranco, ""Ciao!"—Fiat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

(56) References Cited

OTHER PUBLICATIONS

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Bljr90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Groover, M. P., Automation, Production Systems, and Computer-Integrated Manufacturing, 2015, 4th Edition, Pearson, in 811 pages.

Groover, M. P., *Automation, Production Systems, and Computer-Integrated Manufacturing*, 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Haworth, N. et al., "The Relationship between Fuel Economy and Safety Outcomes", Monash University, Accident Research Centre, Dec. 2001, Report No. 188, in 67 pages.

Horsey, J., "Vezo 360 4K 360 dash cam from $149", Geeky Gadgets, Apr. 3, 2019, in 12 pages. URL: https://www.geeky-gadgets.com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS One, Apr. 2017, vol. 12(4): e0174959, in 16 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable.com/article/netradyne-driveri-ai-driver-safety.

Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.

Malamas, Ellas N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www.youtube.com/watch?v=iMOab9Ow_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www.youtube.com/watch?v=jhULDLj9iek.

Netradyne presentation, Netradyne, Oct. 2016, in 23 pages.

Netradyne, "Driver•i™ Catches No Stop ad Stop Sign | Fleet Management Technology" [video], YouTube, Oct. 3, 2017, screenshot in 1 page. URL: https://www.youtube.com/watch?v=l8sX3X02aJo.

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.

Netradyne, Driver Card 1, 2018, in 2 pages (ND_ITC_0001-ND_ITC_0002).

Netradyne, Driver Card 2, 2018, in 2 pages (ND_ITC_0003-ND_ITC_0004).

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

Ohidan, A., "Fiat and AKQA Launch Eco:Drive™", Science 2.0, Oct. 7, 2008, in 4 pages. URL: https://www.science20.com/newswire/fiat_and_akqa_launch_eco_drive_tm.

Perez, L. et al., "Robot Guidance Using Machine Vision Techniques in Industrial Environments: A Comparative Review", Sensors, Mar. 2016, vol. 16(3), in 27 pages.

Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Tzafestas, S. G. (ed.), *Web-Based Control and Robotics Education*, 2009, Springer, ISBN 978-90-481-2504-3, in 362 pages. [uploaded in 3 parts].

Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.

Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

(56) References Cited

OTHER PUBLICATIONS

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technololgy/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 Biggest Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.

\* cited by examiner

DRIVER ALERTING AND FEEDBACK

TECHNICAL FIELD

Embodiments of the present disclosure relate to systems and methods for detecting events and receiving event feedback from drivers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It can be important to detect events and behaviors during driving that can impact safety. However, there are several challenges in doing so. A safety monitoring system that has many false positives or nuisance alerts may cause real safety events to be overlooked, while false negatives can make it difficult to detect some safety issues.

SUMMARY

The systems, methods, and devices described herein each have several aspects, no single one of which is solely responsible for its desirable attributes. Without limiting the scope of this disclosure, several non-limiting features will now be described briefly.

Tracking driver behavior and identifying potential safety issues can be important for ensuring compliance with regulations, reducing accidents, and so forth. Safety monitoring systems can be used to monitor potential for potential safety issues. Safety monitoring systems can include various monitoring devices, such as driver-facing dash cams, outward-facing dash cams, vehicle gateways, and so forth, which can provide rich data for detecting safety events. However, in some cases, safety monitoring systems can be overwhelming. For example, a safety monitoring system can incorrectly identify issues, such as identifying a driver as distracted when they were not. Misidentification of issues can lead to large numbers of safety events being recorded, and it can be difficult to sort through safety events to identify which ones are false positives, which are genuine but minor, and which are significant. Accordingly, it can be beneficial to have safety monitoring systems that can alert drivers of potential issues and solicit feedback in real time or substantially real time in order to better identify significant, real issues while minimizing false positives and nuisance warnings.

A safety monitoring device, such as a driver-facing camera can be configured to automatically trigger alerts (e.g., audible alerts, visual alerts, and so forth) whenever a driver performs certain behaviors, such as taking a call, looking at their phone while driving, or driving while drowsy. Similarly, an outward-facing camera can be used to detect behaviors and events such as rolling stops and following too closely. In some cases, a safety monitoring device can include accelerometers, gyroscopes, and so forth, and/or can be connected directly to a vehicle (e.g., via an on-board diagnostics port) to detect behaviors such as harsh accelerations. In some embodiments, a dash cam can be connected to a vehicle gateway, which can be equipped with sensors such as inertial measurement units and/or can be connected to the vehicle to monitor operating parameters. In some embodiments, an inertial measurement unit and/or information received from the vehicle can include inertial measurement data. Inertial measurement data can include, for example, acceleration, rotation, relative and/or absolute orientation, and so forth. In some cases, multi-modal data can be used to identify safety events. For example, a safety monitoring system can include a driver-facing camera and a vehicle gateway having an inertial measurement unit. The driver-facing camera may detect that the driver appears drowsy, while the inertial measurement unit may indicate that the driver is swerving or drifting off the road.

In some cases, a safety monitoring device can falsely identify issues. Thus, it can be desirable for a driver to be able to identify false positives in real time or in substantially real time. If drivers only review alerts at the end of their shift, the end of the week, and so forth, they may not remember specific events and may have trouble identifying which events were false positives and which were real. However, if a driver can identify false positives in real time or at least soon after an event, such events can be deleted, flagged for further review, and so forth.

In some embodiments, a safety monitoring system can provide notifications or alerts (as determined by one or more safety monitoring devices) to the driver using a dash cam, using the driver's smartphone, and/or the like. For example, the safety monitoring system can display an alert on a screen of the dash cam, can illuminate a light such as a notification LED, can provide an audible alert, and/or the like. In some embodiments, the notification can be verbose and describe the nature of the safety event (e.g., "following too closely"), while in other embodiments, a notification may be a simple beep or other indication that does not indicate the type of event that was detected. In some embodiments, a safety monitoring system can push a notification, text message, or other alert to the driver's smartphone.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
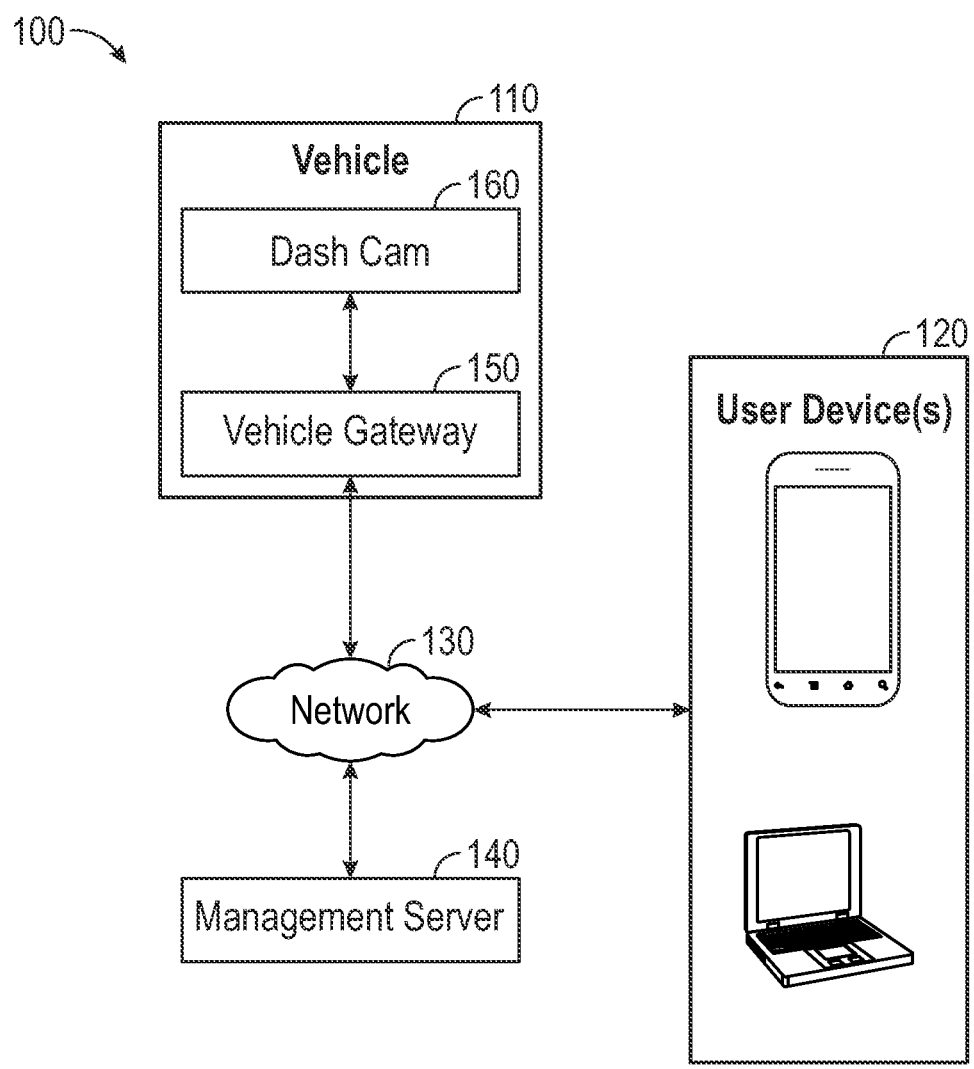
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As discussed briefly above and as will now be described in greater detail, providing safety alerts and receiving feedback from drivers in real time or substantially real time can have many benefits. The systems and methods described herein can facilitate such feedback, which can improve driver safety, improve the detection of safety events, and so forth.

According to various implementations, a safety monitoring device, such as a driver-facing camera can be configured to automatically trigger alerts (e.g., audible alerts, visual alerts, and so forth) whenever a driver performs certain behaviors, such as taking a call, looking at their phone while driving, or driving while drowsy. Similarly, an outward-facing camera can be used to detect behaviors and events such as rolling stops and following too closely. In some cases, a safety monitoring device can include accelerometers, gyroscopes, and so forth, and/or can be connected directly to a vehicle (e.g., via an on-board diagnostics port) to detect behaviors such as harsh accelerations. In some embodiments, a dash cam can be connected to a vehicle gateway, which can be equipped with sensors such as inertial measurement units and/or can be connected to the vehicle to monitor operating parameters. In some embodiments, an inertial measurement unit and/or information received from the vehicle can include inertial measurement data. Inertial measurement data can include, for example, acceleration, rotation, relative and/or absolute orientation, and so forth. In some cases, multi-modal data can be used to identify safety events. For example, a safety monitoring system can include a driver-facing camera and a vehicle gateway having an inertial measurement unit. The driver-facing camera may detect that the driver appears drowsy, while the inertial measurement unit may indicate that the driver is swerving or drifting off the road.

In some cases, a safety monitoring device can falsely identify issues. Thus, it can be desirable for a driver to be able to identify false positives in real time or in substantially real time. If drivers only review alerts at the end of their shift, the end of the week, and so forth, they may not remember specific events and may have trouble identifying which events were false positives and which were real. However, if a driver can identify false positives in real time or at least soon after an event, such events can be deleted, flagged for further review, and so forth.

According to various implementations, a safety monitoring system (also referred to herein as "the system") can provide notifications or alerts (as determined by one or more safety monitoring devices) to the driver using a dash cam, using the driver's smartphone, and/or the like. For example, the safety monitoring system can display an alert on a screen of the dash cam, can illuminate a light such as a notification LED, can provide an audible alert, and/or the like. In some embodiments, the notification can be verbose and describe the nature of the safety event (e.g., "following too closely"), while in other embodiments, a notification may be a simple beep or other indication that does not indicate the type of event that was detected. In some embodiments, a safety monitoring system can push a notification, text message, or other alert to the driver's smartphone.

In some embodiments, the safety monitoring system can be configured to receive real time or substantially real time feedback from the driver. For example, the safety monitoring system can be configured to provide an alert to the driver and to then monitor for feedback from the driver. In some embodiments, the safety monitoring system can receive feedback via one or more methods. For example, a safety monitoring system can be configured to receive feedback using voice, video, touch input (e.g., using a touchscreen), mechanical input (e.g., using a physical button or buttons), and so forth. In some embodiments, a safety monitoring system can implement a delay before receiving feedback.

For example, if a driver is talking on their phone and receives a notification from the safety monitoring system, the system may wait for a period of time (e.g., one second, two seconds, and/or the like) before listening for a response, which may help prevent the system from detecting the behavior that triggered the alert as a response to the alert (e.g., if the driver was talking on the phone, it would be undesirable to interpret the driver's phone conversation as a response to the alert). In some embodiments, a driver can submit feedback via a dash cam. For example, the dash cam can be equipped with a microphone to detect an audible response from the driver, can be configured to interpret driver motions or gestures (e.g., a thumbs up may indicate a real event, waving away may indicate a false event, and so forth). In some embodiments, a dash cam or other monitoring device can have a plurality of microphones, which may help to filter out background noise such as road noise, music, and/or the like. In some embodiments, a safety monitoring device such as a dash cam can have physical buttons, a touchscreen, and/or the like which can be used by the driver to provide feedback regarding a safety event. In some embodiments, the driver can respond to a safety event using their smartphone, in real time and/or during later review of the safety events. In some embodiments, a driver can change their responses later. For example, the system may misinterpret the driver's feedback.

As used herein, real time, also referred to as "substantially" real time, can include any time period that is near to the detection of the safety event. For example, receiving feedback in real time or substantially real time can include receiving feedback within about 1 second, about 2 seconds, about 3 seconds, about 5 seconds, about 10 seconds, about 30 seconds, about 60 seconds, about 120 seconds, about 180 seconds, or about 300 seconds of the detection of a safety event. Real time or substantially real time can include any time between these times, depending upon the specific implementation.

In some embodiments, rather than using real time feedback, the driver can use their smartphone or other device to review events later, for example at the end of a shift or after completing part of a route. In some embodiments, users can disable real time alerts and/or feedback, for example because such alerts may be distracting. Enabling or disabling real time alerts and/or real time feedback may be done by individual drivers, at the organization level, and so forth.

In some implementations, a safety monitoring system can use machine learning or artificial intelligence (AI/ML) models to detect events and/or for various other functionality, as described herein. For example, a model can be trained to recognize when a driver is not wearing a seatbelt, is holding a smartphone, is looking away from the road, and so forth. Similarly, a model can be trained to detect other vehicles, road signs, and so forth to determine if a driver is following too closely, failing to stop at stop signs, and/or the like. However, AI/ML models may incorrectly identify events. For example, due to camera placement, driver clothing, vehicle configuration, and/or the like, an AI/ML model may consistently incorrectly identify safety issues.

In some embodiments, an AI/ML model can be retrained using new monitoring data. In some embodiments, the AI/ML model can be customized. For example, an AI/ML model can be customized for a particular organization, group of drivers, group of vehicles, and/or the like. Such groupings can be useful if, for example, an organization has a fleet of vehicles that all have similar issues (e.g., older vehicles might be more likely to show some types of events such as harsh braking), if an organization experiences an issue due to, for example, camera placement in its vehicles, uniforms worn by its employees, and/or the like. In some embodiments, a model can be customized for a group of drivers. In some embodiments, the group of drivers can all be within the same organization (e.g., the same employer) and/or can share one or more common characteristics. For example, drivers may be grouped by how many accidents they have had, by certain types of behavior (e.g., grouping drivers who often make harsh turns), and so forth. In some embodiments, a customized model can be a global model (e.g., a model that is not specific to any particular driver, group, organization, and/or the like) that is then modified or adjusted based on the specific needs of an organization, group, and/or the like.

In some embodiments, each driver can be associated with a particular model. For example, when a driver begins a job, they may log in to the safety monitoring system, for example using an RFID card or other device, facial recognition, typing in credentials, and/or the like. In some embodiments, the model associated with the driver can be transmitted to a safety monitoring device (e.g., a dash cam) from a backend server (also referred to herein as a management server) and can be run locally on the device. In some embodiments, a common or global model can be used, and customized configuration information such as weights or other parameters for the model can be associated with a driver, group of drivers, vehicle type, organization, and so forth, and can be sent to the safety monitoring device. In some embodiments, a safety monitoring device can store parameters and/or weights for multiple types of drivers, groups of drivers, and/or the like, and can be configured to apply the appropriate parameters and/or weights to the safety event detection model based on information such as the driver identity.

In other embodiments, data can be transmitted from the safety monitoring device (e.g., dash cam) to a backend server for processing using the model associated with the driver. Local processing can be preferable as it can generally be faster and more reliable than remote processing (e.g., local processing can analyze data and report events to the driver even when there is no network connection available). Additionally, local processing can use less data as there is no need to send video or other large segments of data to the backend server. For example, when using local processing, only video related to detected events may be transmitted to a backend server.

Model training can be done locally and/or on a backend server. Typically, a backend server can have greater processing power, thus training on the backend server may be preferable. Accordingly, in some embodiments, a device can gather and store safety event data and driver feedback data and can send the data to a backend server for training. In some embodiments, the data can be reviewed (e.g., by a safety coach) before being used for training. In some embodiments, drivers can be assigned a trustworthiness score or other indicator and, if their trustworthiness score is above a threshold value, event data and driver feedback data can be used for model training without review by a third party such as a safety coach. However, if data is used for model training without review, the data may later be removed or updated if a safety coach or other third party determines that the driver's feedback was erroneous (e.g., the driver indicated a false positive when the system correctly detected an event, or the driver indicated a true positive when the system incorrectly detected an event).

As discussed above, the trained model can be transmitted to a safety monitoring device such as a dash cam. In some embodiments a safety monitoring system may include various components, such as dash cams, vehicle gateways, and/or the like. Some components of the safety monitoring system may have limited processing power. Thus, for example, data can be gathered by a relatively low-power device such as a vehicle gateway and can be sent to a relatively powerful device (e.g., a dash cam) to be processed. Some components may be equipped with communication hardware (e.g., Wi-Fi and/or cellular radios) while other components may not have such hardware. Thus, for example, if an event is detected by a dash cam, information related to the event may be transmitted to a vehicle gateway for upload to a backend server.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

A management server (or "backend," "cloud," or "backend server system") can comprise one or more network-accessible servers configured to communicate with various devices, such as vehicle gateways, asset gateways, industrial gateways, and/or other devices. For example, the management server may be configured to communicate with multiple vehicle devices (e.g., via a vehicle gateway and/or communication circuitry of a dashcam), such as each of a fleet of hundreds, thousands, or more vehicles. Similarly, a management server may be configured to communicate with multiple asset devices (e.g., asset gateways) attached to and/or corresponding to respective assets. Thus, the management server may have context and perspective that individual devices do not have. With reference to vehicle devices, for example, the management server may include data associated with a large quantity of vehicles, such as vehicles across a fleet or within a geographic area. Thus, the management server may perform analysis of asset data across multiple vehicles and between groups of vehicles (e.g., comparison of fleets operated by different entities). A backend server system may also include a feedback system that periodically updates event models used by vehicle devices to provide immediate in-vehicle alerts, such as when the backend server has optimized an event model based on analysis of asset data associated with many safety events, potentially across multiple fleets of vehicles.

A vehicle device can include one or more electronic components positioned in or on a vehicle and configured to communicate with a backend server system (also referred to as a "backend" or "cloud"). A vehicle device includes one or more sensors, such as one or more video sensors, audio sensors, accelerometers, global positioning systems (GPS), and the like, which may be housed in a single enclosure (e.g., a dashcam) or multipole enclosures. A vehicle device may include a single enclosure (e.g., a dashcam) that houses multiple sensors as well as communication circuitry configured to transmit sensor data to a backend (or "backend server system"). Alternatively, a vehicle device may include multiple enclosures, such as a dashcam that may be mounted on a front window of a vehicle and a separate vehicle gateway that may be positioned at a different location in the vehicle, such as under the dashboard. In this example implementation, the dashcam may be configured to acquire various sensor data, such as from one or more cameras of the dashcam, and communicate sensor data with the vehicle gateway, which includes communication circuitry configured to communicate with the backend. Vehicle devices also include memory for storing software code that is usable to execute one or more event detection models, such as neural network or other artificial intelligence programming logic, that allow the vehicle device to trigger events without communication with the backend.

A vehicle gateway (or "VG") can include a device positioned in or on a vehicle, which is configured to communicate with one or more sensors in the vehicle, e.g., in a separate dashcam mounted in the vehicle, and to a backend server. In some embodiments, a vehicle gateway can be installed within a vehicle by coupling an interface of the vehicle gateway to an on-board diagnostic (OBD) port of the vehicle. A vehicle gateway may include short-range communication circuitry, such as near field communication ("NFC"), Bluetooth ("BT"), Bluetooth Low Energy ("BLE"), and/or the like, for communicating with sensors in the vehicle and/or other devices that are in proximity to the vehicle (e.g., outside of the vehicle).

An asset gateway (or "AG") can include a device positioned in or on an asset, which is configured to communicate with one or more sensors and/or vehicle gateways. In some embodiments, an asset gateway can be configured to communicate with a backend server. An asset gateway may include short-range communication circuitry, such as near field communication ("NFC"), Bluetooth ("BT"), Bluetooth Low Energy ("BLE"), and/or the like, for communicating with sensors, vehicle gateways, and/or other devices that in proximity to the asset gateway. In some embodiments, an asset gateway may include a GPS receiver for determining the location of the asset gateway. In some embodiments, an asset gateway may include a cellular radio for communicating with a backend server. In some embodiments, a cellular radio may be used to approximate the location of an asset gateway.

A data store can include any computer readable storage medium and/or device (or collection of data storage mediums and/or devices). Examples of data stores include, but are not limited to, optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. Another example of a data store is a hosted storage environment that includes a collection of physical data storage devices that may be remotely accessible and may be rapidly provisioned as needed (commonly referred to as "cloud" storage).

A database can include any data structure (and/or combinations of multiple data structures) for storing and/or organizing data, including, but not limited to, relational databases (e.g., Oracle databases, PostgreSQL databases, and/or the like), non-relational databases (e.g., NoSQL databases, and/or the like), in-memory databases, spreadsheets, comma separated values (CSV) files, Extensible Markup Language (XML) files, text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, and/or the like. As used herein, a data source may refer to a table in a relational database, for example.

Example Driver Feedback Embodiments

FIG. 1 illustrates a block diagram of an example operating environment 100 in which one or more aspects of the safety monitoring system of the present disclosure can operate, according to various embodiments. The operating environment 100 can include one or more user devices 120, a management server 140, one or more vehicles 110. Each vehicle can be equipped with one or more safety monitoring devices. Such safety monitoring devices may include, for example, a vehicle gateway 150 and a dash cam 160. The various components of the operating environment 100 can communicate with each other via the network 130 as shown. While FIG. 1 depicts a scenario in which the vehicle gateway 150 communicates with other devices over the network 130 and the dash cam 160 communicates with the vehicle gateway 150 but does not communicate directly over the network 130, other configurations are possible. For example, in some embodiments, the dash cam 160 can include communications hardware that enable it to communicate with other devices via the network 130. In general, at least one safety monitoring device on the vehicle 110 can communicate with other devices using the network 130. In some embodiments, safety monitoring devices and other equipment that is associated with the vehicle 110 can communicate with each other via local communications methods, for example Bluetooth, Bluetooth Low Energy, Zigbee, local Wi-Fi networking, and so forth.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, a 5G network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2:
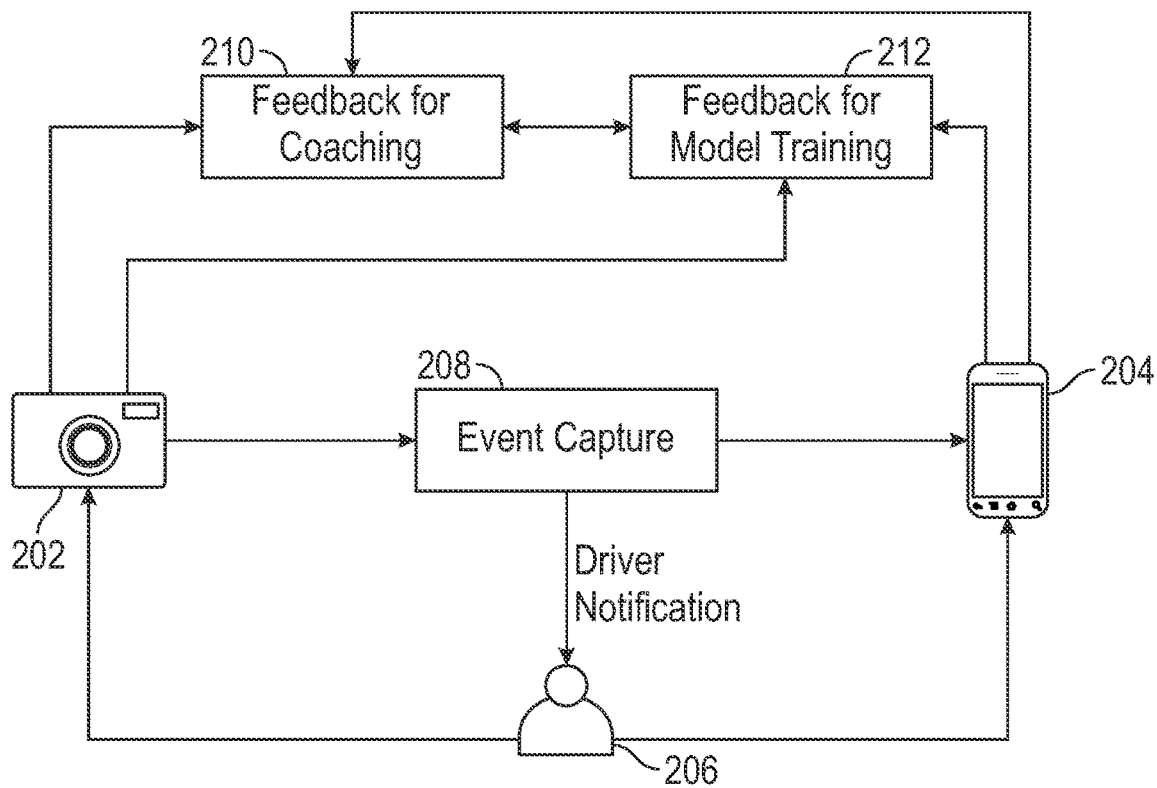
FIG. 2 illustrates a block diagram showing various components and processes in a safety monitoring and feedback system, according to various embodiments of the present disclosure.

FIG. 2 illustrates an example schematic of safety monitoring and feedback of the safety monitoring system, according to some embodiments. As shown in FIG. 2, a safety monitoring device 202 (which can be a dash cam, vehicle gateway, or other safety monitoring device) can detect harsh events or other safety events (e.g., distracted driving, drowsy driving, and/or the like). The system can be configured to capture safety events at block 208. For example, a safety monitoring device can detect an event and can report the event to a management server. Upon detecting a safety event, an alert can be presented to the driver 206. The alert can be shown on a user device 204 such as a smartphone or tablet and/or can be provided to the driver using other means, such as an audible or visual alert on a safety monitoring device such as a dash cam. The driver 206 can provide feedback regarding the event using the safety monitoring device 202 and/or the user device 204. In some embodiments, the driver 206 can provide feedback in real time or substantially real time. In some embodiments, an event may be detected using a first monitoring device (e.g., a vehicle gateway) and feedback may be received from the driver 206 via a second monitoring device (e.g., a dash cam). The detected events and any feedback received from the driver 206 can be used for various purposes. For example, the event data and feedback data can be used for feedback for coaching drivers as shown at block 210 and/or for model training as shown at block 212 (e.g., to improve the detection of safety events).

Figure 3:
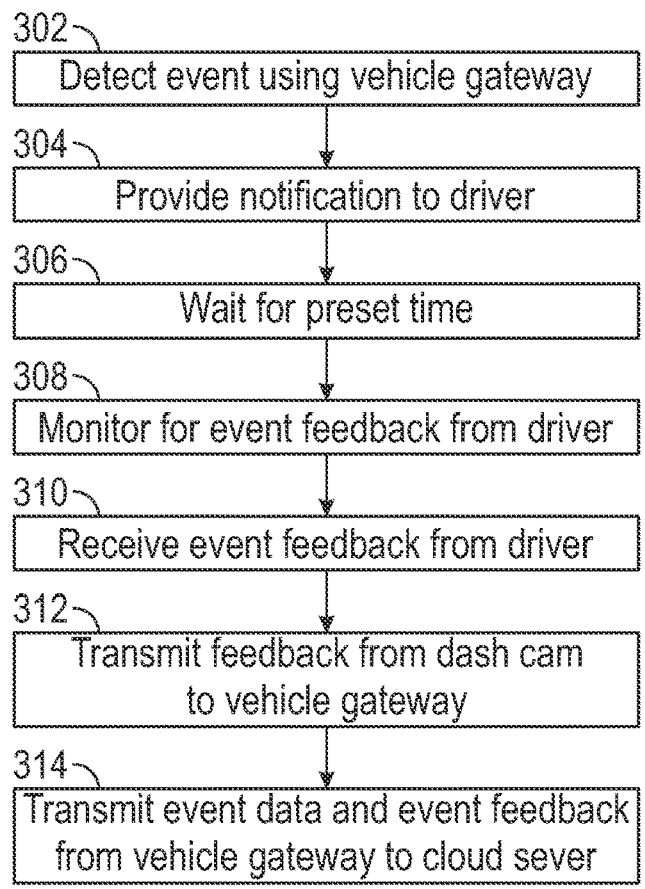
FIG. 3 illustrates a block diagram of a process for detecting an event and receiving driver feedback, according to various embodiments of the present disclosure.

FIG. 3 illustrates a block diagram showing an example driver feedback process of the system. Various blocks of the block diagram may be performed by, for example, the management server and/or other computing devices or components of the system. At block 302, a vehicle gateway device can detect a safety event. For example, the vehicle gateway may detect a harsh top, harsh acceleration, harsh turn, and so forth. The vehicle gateway can provide a notification/alert to the driver at block 304. The vehicle gateway may not have audio or video output capabilities, and thus may rely on a connected dash cam or other safety monitoring device with output capabilities for providing the notification to the driver. At block 306, a safety monitoring device can be configured to wait for a first period of time before receiving feedback from the driver. The first period of time can be a preset time, for example 0.5 seconds, 1 second, 2 seconds, 3 seconds, 4 seconds, 5 seconds, or more, or any number between these numbers, or less if desired, and the safety monitor can be configured to wait the first period of time before accepting feedback from the driver, which can help prevent the safety monitoring device from receiving unintentional feedback (for example if the driver was reacting to the safety event or was talking to someone on the phone). In some embodiments, a wait period (e.g., the first period of time) can depend on the type of event detected. At block 308, the safety monitoring device can monitor for feedback from the driver. The safety monitoring device can be configured to monitor for feedback for a second period of time, which can be a predetermined amount of time after providing the notification/alert, for example one second, two seconds, three seconds, four seconds, five seconds, ten seconds, fifteen seconds, and so forth, or any period of time as desired. In various implementations, the first period of time and the second period of time can be determined or set such that the system may receive real time or substantially real time feedback for a detected event. As discussed above, feedback can be in the form of sound (e.g., verbal command or input, such as "yes", "correct," "incorrect," "no," or "false alert", which may be detected, e.g., by a dash cam, user device, or other device with a microphone in the vehicle), pushing a button (either physical or virtual, e.g., via camera detection or via a physical button, touch screen, or other user interface element of a dash cam, user device, or other device in the vehicle), making a gesture (e.g., a hand wave, thumbs up, thumbs down, head nod, head shake, or other gesture, which may be detected, e.g., by a dash cam, user device, or other device with a camera pointing into the vehicle), and so forth depending upon the specific implementation. At block 310, the safety monitoring device can receive feedback from the driver. At block 312, the driver's feedback can be transmitted from the safety monitoring device that received the feedback (e.g., a dash cam) to a safety monitoring device with cellular connectivity (e.g., a vehicle gateway). At block 314, the vehicle gateway (or other device that has cellular or other network connectivity) can transmit the driver feedback and the event data to a management server.

Figure 4:
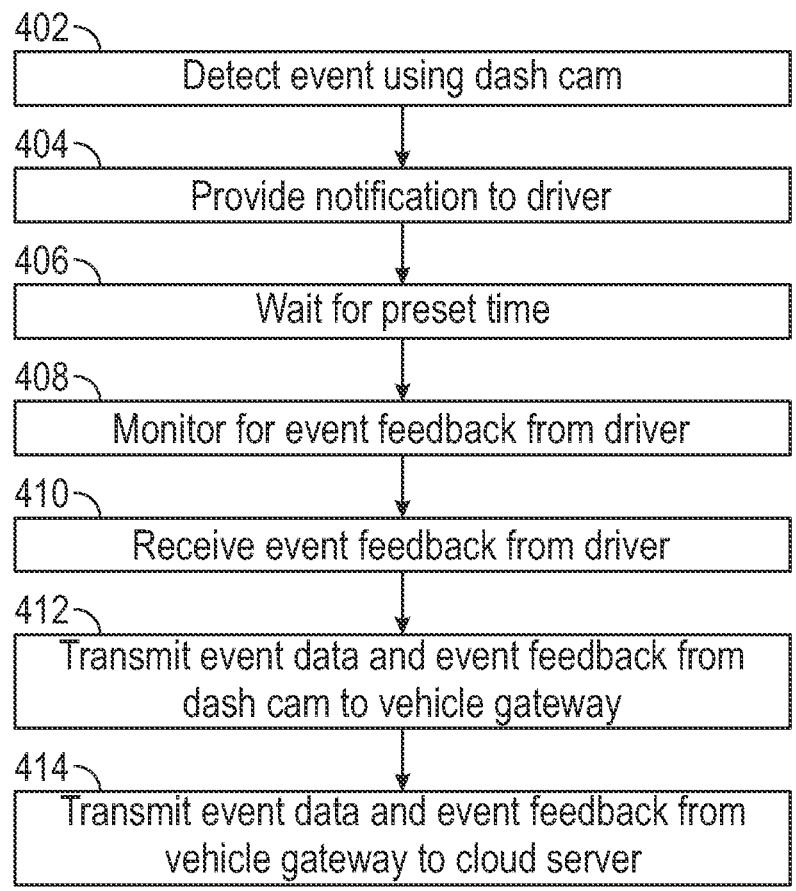
FIG. 4 illustrates a block diagram of another process for detecting an event and receiving driver feedback, according to various embodiments of the present disclosure.

FIG. 4 illustrates a block diagram showing another example driver feedback process of the system. Various blocks of the block diagram may be performed by, for example, the management server and/or other computing devices or components of the system. The process depicted in FIG. 4 is broadly similar to the process of FIG. 3, except that detecting a safety event and receiving driver feedback for the event occur on the same device. At block 402, a safety event can be detected using a dash cam or other device capable of receiving feedback from the driver. At block 404, the dash cam can provide a notification/alert to the driver of the safety event. At block 406, the dash cam can, as discussed above, wait a first predetermined time after providing the notification/alert in order to reduce the likelihood of erroneous or unintentional feedback. At block 408, the dash cam can monitor for feedback from the driver regarding the safety event for a second period of time. In various implementations, the time predetermined amount of time can be determined or set such that the system may receive real time feedback for a detected event. As discussed above, feedback may be provided in the form of audible feedback, gestures, button presses, and so forth. At block 412, the dash cam, which may not have cellular or other connectivity for accessing remote systems such as management servers, can transmit the event data (e.g., video) and driver feedback to a safety monitoring device that has cellular connectivity, such as a vehicle gateway. At block 414, the vehicle gateway can transmit the event data and the driver feedback (if any feedback was received) to a management server.

In some embodiments, the dash cam can include cellular connectivity. Thus, instead of transmitting the event data and feedback to a vehicle gateway for transmission to the management server, after receiving feedback at block 410, the dash cam may directly transmit the event data and driver feedback to the management server.

Figure 5:
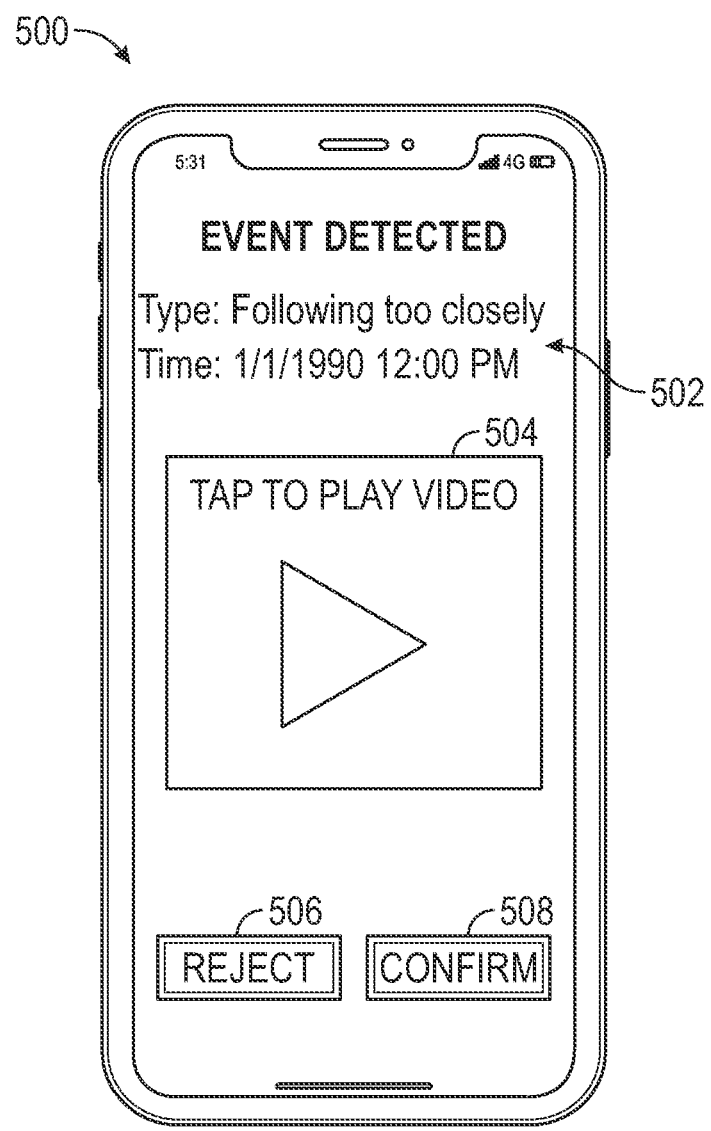
FIG. 5 illustrates an example user interface for providing driver feedback, according to various embodiments of the present disclosure.

FIG. 5 illustrates an example user interface 500 of the system which a driver can use to provide feedback regarding safety events. The user interface 500 can be presented to a driver using a device such as a smartphone or tablet. The user interface 500 can be used to facilitate real time or substantially real time driver feedback, and/or can be used to review safety events at a later time, such as at the end of a shift or workweek. As shown in FIG. 5, a user interface can include event metadata 502. The event metadata can include a type of event, a time the event occurred, and so forth. In some cases, the driver can review a video 504 of the event. The video 504 may or may not be available depending on various factors such as the type of event. For example, a video may be available for events that are determined from analyzing dash cam video (e.g., following too closely, distracting driving, running through a stop sign or red light, and/or the like), but may not be available for some other types of events, such as harsh acceleration or harsh braking that may be determined primarily or exclusively by a vehicle gateway, although in some embodiments video may be available that corresponds to the time when such an event occurred. The user interface 500 can include various buttons or other input methods for the driver to provide feedback regarding the event. For example, the user interface 500 can include a reject button 506 and a confirm button 508. The driver may press the reject button 506 if the driver thinks that an event was falsely detected. The driver may press the accept button 508 if the driver agrees with the safety event as detected by the safety monitoring system. Other user interfaces are contemplated, including user interfaces that may include one or more features of the example user interfaces described below in reference to FIGS. 6A and 6B.

Figure 6A:
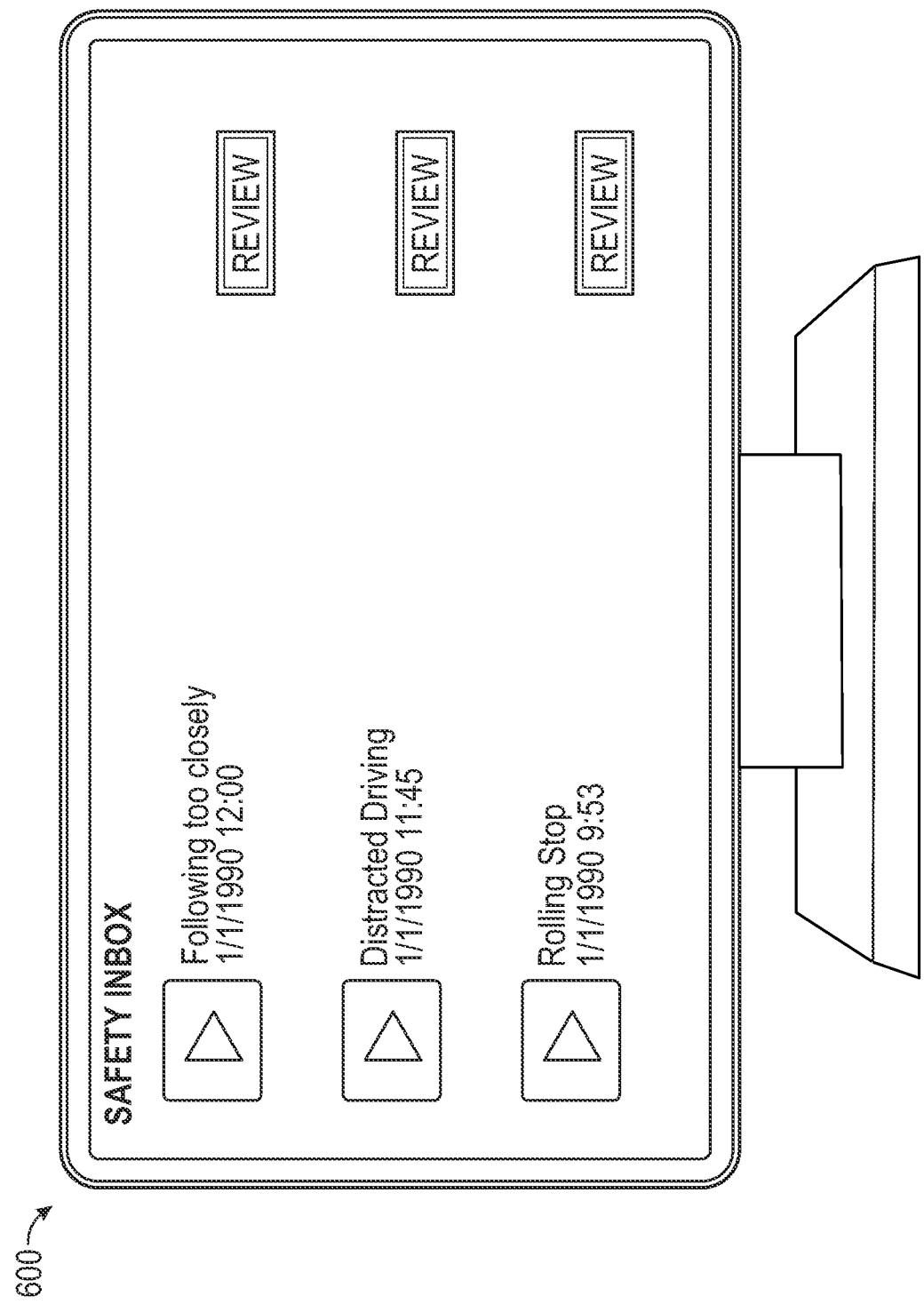
FIGS. 6A-6B illustrate example user interfaces for a safety inbox that can be used to provide driver feedback, according to various embodiments of the present disclosure.
Figure 6B:
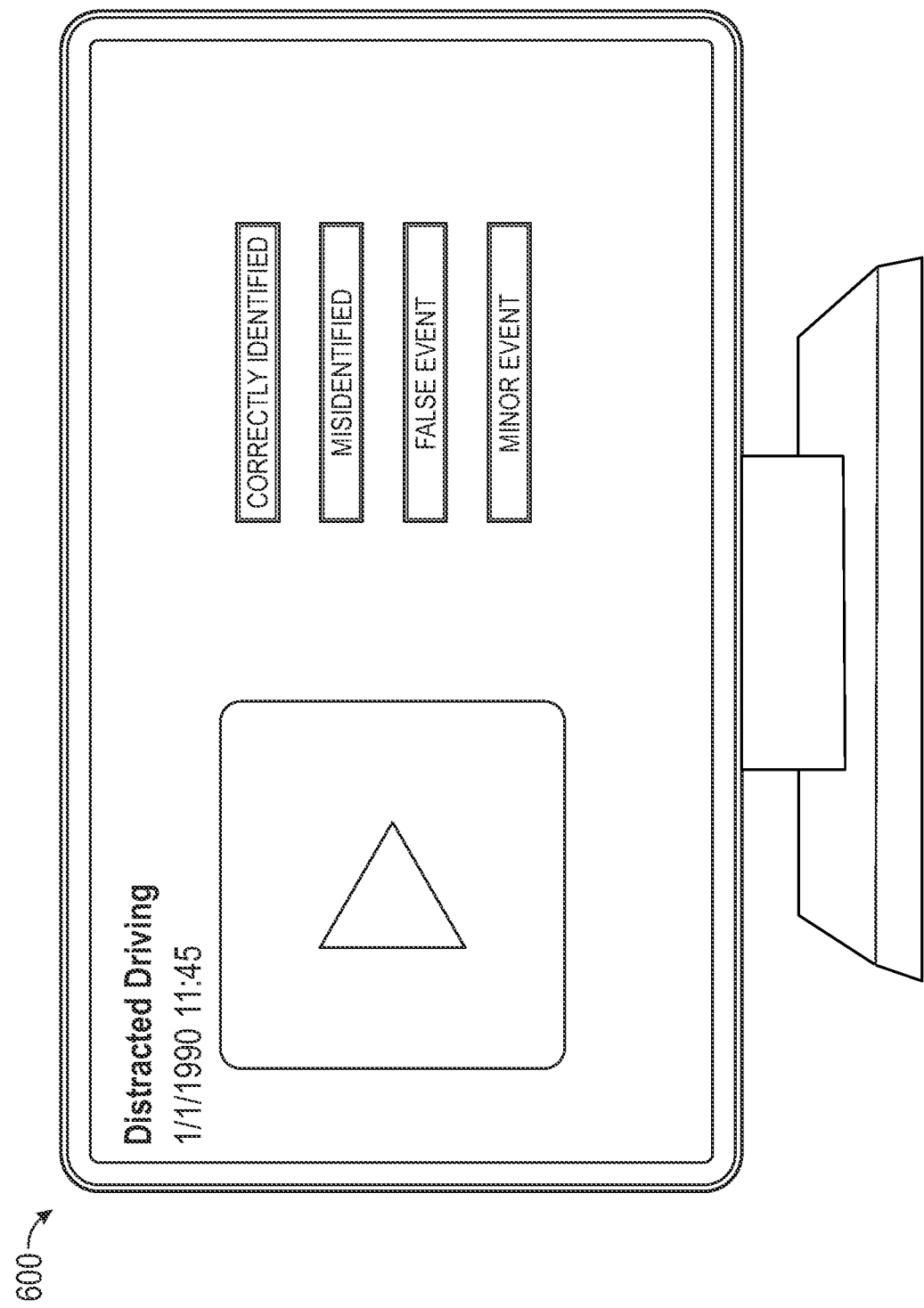

FIGS. 6A and 6B illustrate "safety inbox" user interfaces 600 of the system that can be used to review safety events via a computing device. While the user interface 500 depicted in FIG. 5 may primarily or exclusively be used for real time or substantially real time event review and feedback, in some cases a driver may want to review and provide feedback for safety events in bulk, for example at the end of a shift, at the end of the week, and so forth. In some cases, an organization may have disabled real time feedback functionality and may instead rely on the safety inbox for all or substantially all driver feedback. The interface 600 can present a safety inbox that shows a list of safety events that can be reviewed by the driver. The list of events can include a link to a video of the event (if available), a description of the event, a timestamp for the event, and so forth. Each event can have a review button associated therewith, as shown in FIG. 6A. FIG. 6B depicts the interface 600 after the driver selects to review an event. The interface in 6B can include a description of the event, a timestamp of the event, a video of the event (if applicable), and buttons for providing feedback regarding the event. In some embodiments, the buttons can include reject and/or confirm buttons as shown in FIG. 5. In some embodiments, as shown in FIG. 6B, additional or alternative feedback buttons can be presented to the user. For example, as shown in FIG. 6B, a driver may select that the event was correctly identified, that the event was misidentified, that an event was falsely detected, or that an event was minor. A driver may select that an event was misidentified if a safety monitoring system correctly detected an event but misidentified the event. For example, a safety monitoring system may detect that a driver was using their phone when in reality the driver was eating. A driver may select that an event is a false event when the safety monitoring system detected an event, but no actual event occurred (for example, a driver's hand placement on the steering wheel may have resulted in a false event indicating the driver was using their smartphone. In some cases, a driver may indicate that an event was a minor event. For example, a safety monitoring system may detect cell phone usage when a driver dismisses or accepts a hands-free call, changes a music selection, and so forth. In some cases, a driver may use the interface 600 to review safety events for which the driver has already provided feedback, e.g., events for which the driver provided real time or substantially real time feedback, which can be desirable if, for example, a driver provided incorrect feedback previously, if the driver's feedback was misinterpreted, or if the driver did not intend to provide the earlier feedback.

As discussed above, driver feedback can be used for a variety of purposes. For example, driver feedback can be used in conjunction with safety event data to train event detection models, which can reduce the occurrence of false event detection, increase the detection of true safety events, and so forth.

Figure 7:
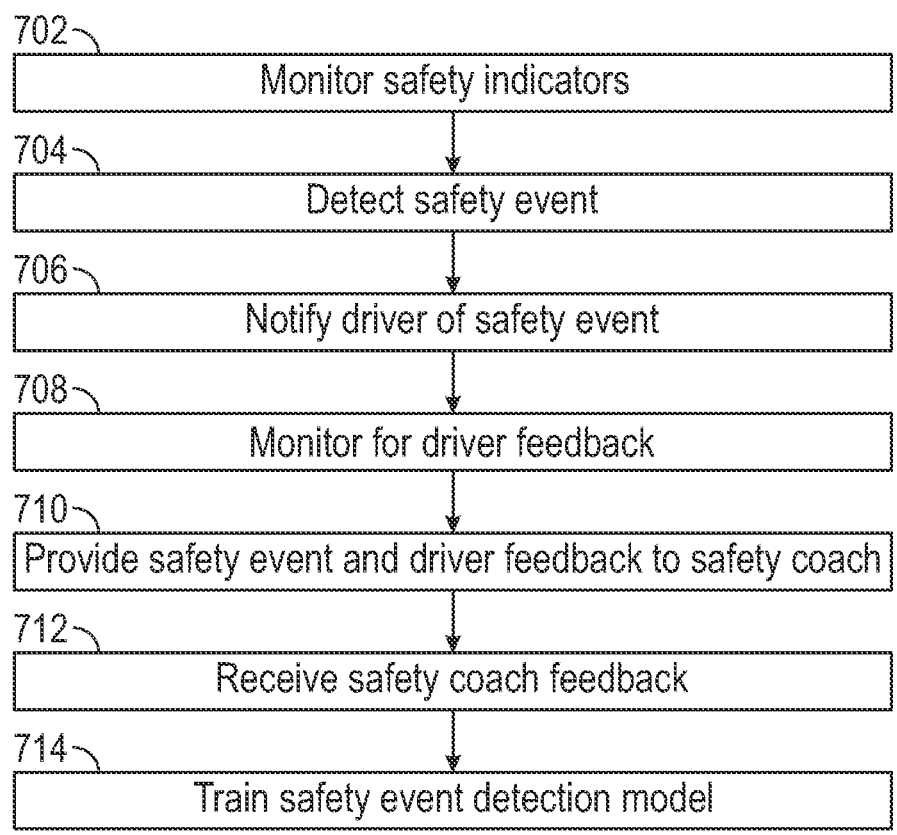
FIG. 7 illustrates a block diagram of a process for selecting safety event data for model training, according to various embodiments of the present disclosure.

FIG. 7 is a block diagram illustrating an example process of the system for using safety event data and related data to train an event detection model. Various blocks of the block diagram may be performed by, for example, the management server and/or other computing devices or components of the system. At block 702, a safety monitoring system can monitor for safety events, for example by monitoring acceleration, turning, braking, distance to other vehicles, traffic controls such as stop signs, yield signs, lights, and/or the like. At block 704, the safety monitoring system can detect a safety event. At block 706, the driver can be notified of the safety event, for example via a dash cam, the driver's smartphone, and so forth. At block 708, the safety monitoring system can monitor for driver feedback. In some embodiments, the driver can provide feedback in real time or in substantially real time. In other embodiments, the driver may not provide feedback in real time, but may instead review events later, for example using a safety inbox as depicted in FIGS. 6A and 6B. At block 710, the safety monitoring device can transmit the data to a management server or other backend server, and the data can be made available to a safety coach for review. At block 712, the server can receive feedback from the safety coach. At block 714, the server can train a safety event detection model using the safety event data, driver feedback, and/or safety coach feedback.

Figure 8:
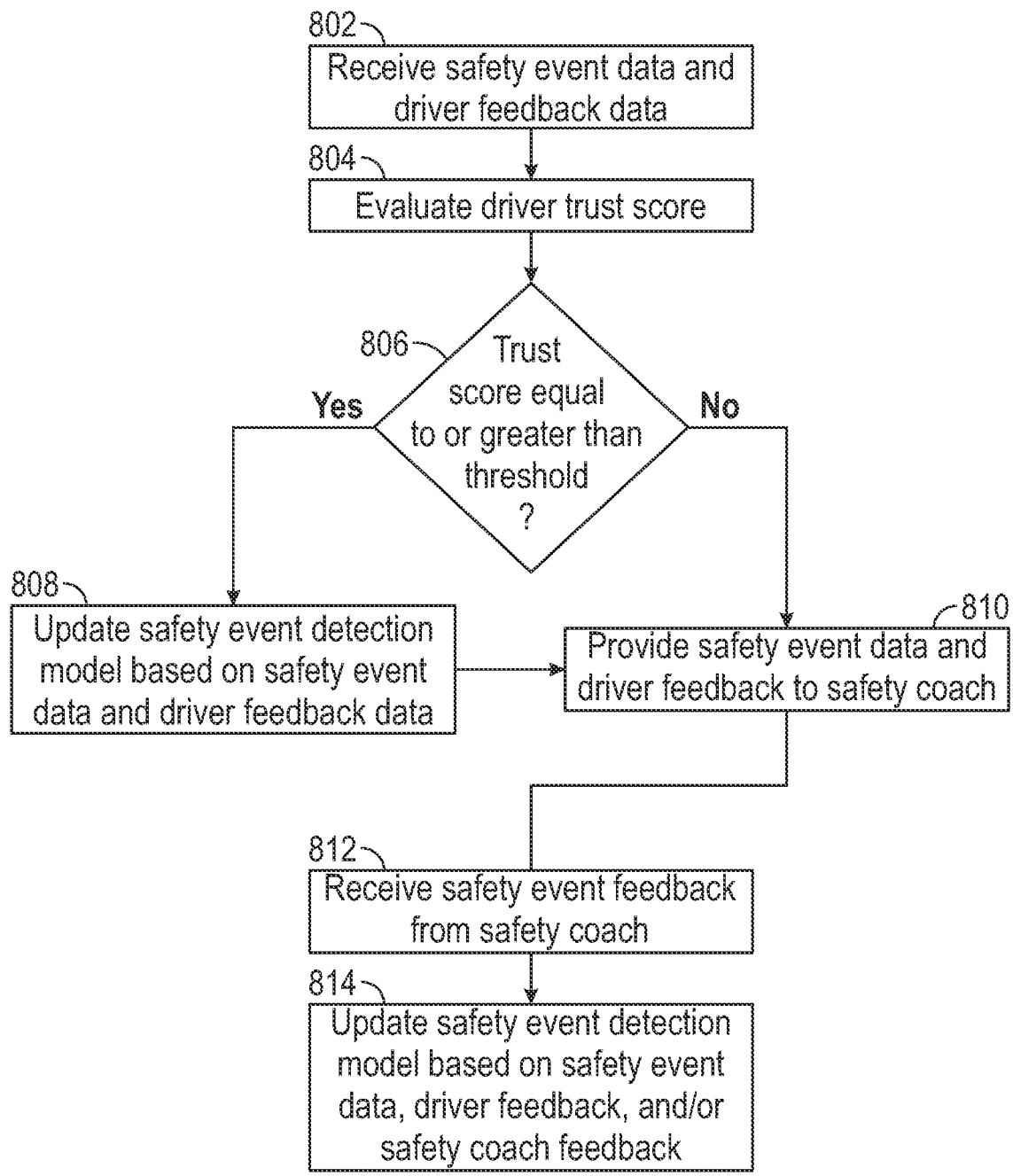
FIG. 8 illustrates a block diagram of a process for tuning a model using safety event data, according to various embodiments of the present disclosure.

FIG. 8 is a block diagram illustrating another example process of the system for using safety event data and related data to train an event detection model. Various blocks of the block diagram may be performed by, for example, the management server and/or other computing devices or components of the system. At block 802, a system can receive safety event data and driver feedback data provided by a driver. At block 804, the system can evaluate a driver trust score associated with the driver. At block 806, the system can evaluate whether the driver's trust score meets or exceeds a threshold value. If the driver's trust score meets or exceeds the threshold value, the system can, at block 808, update the event detection model (e.g., retrain the model, modify one or more weights or other parameters, and so forth). If the driver's trust score is below the threshold value, the system may not update the safety event detection model. At block 810, the system can provide the safety event data (and optionally, the driver feedback data) to a safety coach. At block 812, the system can receive feedback for the safety event from the safety coach. At block 814, the system can update the safety event detection model based on the safety event data, driver feedback, and/or safety coach feedback. For example, if the safety event data and driver feedback were previously used for updating the safety event model at block 808 and the safety coach feedback is inconsistent with the driver feedback, the system can be configured to back out or undo the update. On the other hand, if the model was previously updated and the safety coach feedback is consistent with the driver feedback, no action may be taken at block 814 because the model has already been updated. If the model has not previously been updated (for example, because the driver safety score is too low), the system can update the safety event detection model after receiving feedback from the safety coach.

ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

EXAMPLE CLAUSES

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A system comprising: at least one safety monitoring device configured to: monitor information indicative of driver safety; detect, using the information indicative of driver safety, a safety event; alert a driver of the safety event; and receive driver feedback, the driver feedback indicating whether the safety event was correctly detected.

Clause 2. The system of clause 1, wherein the at least one safety monitoring device is coupled to and/or on a vehicle.

Clause 3. The system of clause 1 or 2, wherein the at least one safety monitoring device comprises a dash cam.

Clause 4. The system of clause 1 or 2, wherein the at least one safety device comprises a vehicle gateway.

Clause 5. The system of clause 1 or 2, wherein the at least one safety monitoring device comprises a dash cam and a vehicle gateway.

Clause 6. The system of any of clauses 1-5, wherein the driver feedback is received in substantially real time.

Clause 7. The system of any of clauses 1-6, wherein the system is configured to wait for a first time period after alerting the driver of the safety event before receiving feedback from the driver.

Clause 8. The system of any of clauses 1-7, wherein to receive driver feedback, the system is configured to monitor for a beginning of feedback for a second period of time.

Clause 9. The system of clause 5, wherein the dash cam and the vehicle gateway monitor information indicative of driver safety, wherein the dash cam alerts the driver of the safety event, and wherein feedback is received via the dash cam or via a user device.

Clause 10. The system of any of clauses 1-9, wherein the information indicative of driver safety comprises one or more of inertial measurement data, outward-facing camera data, or inward-facing camera data.

Clause 11. The system of any of clauses 1-10, wherein to detect the safety event, the at least one safety monitoring device is configured to: provide the information indicative of driver safety to a safety event detection model; and receive, from the safety event detection model, safety event information.

Clause 12. The system of clause 11, wherein the safety monitoring device is configured to: receive at least one identifier comprising a driver identifier, an organization identifier, or a vehicle identifier; and apply one or more safety event detection model parameters associated with the at least one identifier to the safety event detection model.

Clause 13. The system of clause 11 or 12, wherein the safety event information comprises a safety event type.

Clause 14. The system of any of clauses 1-13, wherein the at least one safety monitoring device is configured to transmit, via a communications interface, driver feedback to a management server.

Clause 15. The system of any of clauses 1-14, wherein the safety event has a confidence level associated therewith, the confidence level indicative of a likelihood that the safety event was correctly identified.

Clause 16. The system of any of clauses 1-15, wherein the safety event has a severity level associated therewith.

Clause 17. The system of any of clauses 1-16, wherein the safety monitoring device is configured to: transmit the indication of the safety event to a management server; and transmit the driver feedback to the management server.

Clause 18. The system of any of clauses 1-17, wherein to receive driver feedback, the safety monitoring device is configured to monitor for any combination of one or more of audible feedback, visual feedback, touch feedback, or mechanical feedback.

Clause 19. A computer-implemented method for driver safety alerting comprising: monitoring, using at least one safety monitoring device, information indicative of driver safety; detecting, using the information indicative of driver safety, a safety event; alerting a driver of the safety event; and receiving, via the at least one safety monitoring device in substantially real time, driver feedback, the driver feedback indicating whether the safety event was correctly detected.

Clause 20. The computer-implemented method of clause 19, wherein the at least one safety monitoring device is coupled to and/or on a vehicle.

Clause 21. The computer-implemented method of clause 19 or 20, wherein the at least one safety monitoring device comprises a dash cam.

Clause 22. The computer-implemented method of clause 19 or 20, wherein the at least one safety device comprises a vehicle gateway.

Clause 23. The computer-implemented method of clause 19 or 20, wherein the at least one safety monitoring device comprises a dash cam and a vehicle gateway.

Clause 24. The computer-implemented method of any of clauses 19-23, wherein the driver feedback is received in substantially real time.

Clause 25. The computer-implemented method of any of clauses 19-24, further comprising waiting for a first time period after alerting the driver of the safety event before receiving feedback from the driver.

Clause 26. The computer-implemented method of any of clauses 19-25, wherein receiving driver feedback comprises monitoring for a beginning of feedback for a second period of time.

Clause 27. The computer-implemented method of any of clauses 23-25, wherein the dash cam and the vehicle gateway monitor information indicative of driver safety, wherein the dash cam alerts the driver of the safety event, and wherein feedback is received via the dash cam or via a user device.

Clause 28. The computer-implemented method of any of clauses 19-27, wherein the information indicative of driver safety comprises one or more of inertial measurement data, outward-facing camera data, or inward-facing camera data.

Clause 29. The computer-implemented method of any of clauses 19-28, wherein detecting the safety event comprises: providing the information indicate of driver safety to a safety event detection model; and receiving, from the safety event detection model, safety event information.

Clause 30. The computer-implemented method of clause 29, further comprising: receive at least one identifier comprising a driver identifier, an organization identifier, or a vehicle identifier; and apply one or more safety event detection model parameters associated with the at least one identifier to the safety event detection model.

Clause 31. The computer-implemented method of clause 29 or 30, wherein the safety event information comprises a safety event type.

Clause 32. The computer-implemented method of any of clauses 19-31, further comprising transmitting, via a communications interface, driver feedback to a management server.

Clause 33. The computer-implemented method of any of clauses 19-32, wherein the safety event has a confidence level associated therewith, the confidence level indicative of a likelihood that the safety event was correctly identified.

Clause 34. The computer-implemented method of any of clauses 19-33, wherein the safety event has a severity level associated therewith.

Clause 35. The computer-implemented method of any of clauses 19-34, further comprising: transmitting the indication of the safety event to a management server; and transmitting the driver feedback to the management server.

Clause 36. The computer-implemented method of any of clauses 19-35, wherein receiving driver feedback comprises monitoring for any combination of one or more of audible feedback, visual feedback, touch feedback, or mechanical feedback.

Clause 37. A computer-implemented method for training an event detection model comprising: receiving data associated with a driver safety event from a safety monitoring device; receiving feedback associated with the driver safety event from a driver; receiving an indication of an identity of the driver; determining, based on the indication of the identity, a trust score associated with the driver; determining whether the trust score satisfies a threshold value; and in response to determining that the trust score satisfies the threshold value, updating an event detection model based on the driver feedback and the data associated with the driver safety event.

Clause 38. The computer-implemented method of clause 37, further comprising: in response to determining that the trust score does not satisfy the threshold value, not updating the event detection model.

Clause 39. The computer-implemented method of clause 37 or 38, further comprising: receiving, from a reviewer, feedback related to the driver safety event; and in response to determining that the event detection model has been updated and that the reviewer feedback is consistent with the driver feedback, not updating the event detection model.

Clause 40. The computer-implemented method of clause 39, further comprising: in response to determining that the event detection model has been updated and that the reviewer feedback is inconsistent with the driver feedback, updating the model.

Clause 41. The computer-implemented method clauses 39 or 40, further comprising: in response to determining that the event detection model has not been updated, updating the event detection model based at least in part on the reviewer feedback.

Clause 42. A computer system comprising: one or more computer processors configured to execute a plurality of computer executable instructions to cause the computer system to execute the computer-implemented method of any of clauses 19-41.

Clause 43. A computer program product comprising one or more non-transitory computer readable storage mediums having program instructions embodied therewith, the program instructions executable by one or more computer processors to execute the computer-implemented method of any of clauses 19-41.

What is claimed is:

1. A system comprising:
at least one safety monitoring device configured to:
monitor information indicative of driver safety;
detect, using the information indicative of driver safety and a safety event detection model, a safety event, the safety event comprising one or more of distracted driving, drowsy driving, harsh braking, harsh acceleration, or harsh turning;
alert a driver of the safety event;
receive driver feedback, the driver feedback indicating whether the safety event was correctly detected;
determine a trust score associated with the driver, the trust score indicating a trustworthiness of the driver in indicating whether the safety event was correctly detected; and
in response to determining that the trust score is above a threshold, provide the driver feedback to a management server configured to update the safety event detection model based at least on the driver feedback;
wherein the management server is configured to provide the updated safety event detection model to the at least one safety monitoring device, wherein the updated safety event detection model is configured to more accurately detect the safety event than the safety event detection model.

2. The system of claim 1, wherein the at least one safety monitoring device is on a vehicle.

3. The system of claim 1, wherein the driver feedback is received in substantially real time.

4. The system of claim 1, wherein the information indicative of driver safety comprises one or more of inertial measurement data, outward-facing camera data, or inward-facing camera data.

5. The system of claim 1, wherein the at least one safety monitoring device is configured to:
receive at least one identifier comprising a driver identifier, an organization identifier, or a vehicle identifier; and
apply one or more safety event detection model parameters associated with the at least one identifier to the safety event detection model.

6. The system of claim 1, wherein the safety event has a confidence level associated therewith, the confidence level indicative of a likelihood that the safety event was correctly identified.

7. The system of claim 1, wherein to receive driver feedback, the at least one safety monitoring device is configured to monitor for any combination of one or more of audible feedback, visual feedback, touch feedback, or mechanical feedback.

8. The system of claim 1, wherein the driver feedback is accepted after a first time period from detection of the safety event, but not before the first time period.

9. The system of claim 1, wherein the driver feedback is no longer accepted after a second time period from detection of the safety event.

10. A computer-implemented method for driver safety alerting comprising:
monitoring, using at least one safety monitoring device, information indicative of driver safety;
detecting, using the information indicative of driver safety and a safety event detection model, a safety event, the safety event comprising one or more of distracted driving, drowsy driving, harsh braking, harsh acceleration, or harsh turning;
alerting a driver of the safety event;
receiving, via the at least one safety monitoring device in substantially real time, driver feedback, the driver feedback indicating whether the safety event was correctly detected;
determining a trust score associated with the driver, the trust score indicating a trustworthiness of the driver in indicating whether the safety event was correctly detected; and
in response to determining that the trust score is above a threshold, providing the driver feedback to a management server configured to update the safety event detection model based at least on the driver feedback;
wherein the management server is configured to provide the updated safety event detection model to the at least one safety monitoring device, wherein the updated safety event detection model is configured to more accurately detect the safety event than the safety event detection model.

11. The computer-implemented method of claim 10, wherein the at least one safety monitoring device is on a vehicle.

12. The computer-implemented method of claim 10, wherein the driver feedback is received in substantially real time.

13. The computer-implemented method of claim 10, wherein the information indicative of driver safety comprises one or more of inertial measurement data, outward-facing camera data, or inward-facing camera data.

14. The computer-implemented method of claim 10, further comprising:
receive at least one identifier comprising a driver identifier, an organization identifier, or a vehicle identifier; and apply one or more safety event detection model parameters associated with the at least one identifier to the safety event detection model.

15. The computer-implemented method of claim 10, wherein the safety event has a confidence level associated therewith, the confidence level indicative of a likelihood that the safety event was correctly identified.

16. The computer-implemented method of claim 10, wherein receiving driver feedback comprises monitoring for any combination of one or more of audible feedback, visual feedback, touch feedback, or mechanical feedback.

17. A non-transitory computer-readable medium storing a set of instructions that are executable by one or more electronic devices, each having one or more processors, to cause the one or more electronic devices to perform a method comprising:

monitoring, using at least one safety monitoring device, information indicative of driver safety;

detecting, using the information indicative of driver safety and a safety event detection model, a safety event, the safety event comprising one or more of distracted driving, drowsy driving, harsh braking, harsh acceleration, or harsh turning;

alerting a driver of the safety event;

receiving, via the at least one safety monitoring device in substantially real time, driver feedback, the driver feedback indicating whether the safety event was correctly detected;

determining a trust score associated with the driver, the trust score indicating a trustworthiness of the driver in indicating whether the safety event was correctly detected; and in response to determining that the trust score is above a threshold, providing the driver feedback to a management server configured to update the safety event detection model based at least on the driver feedback;

wherein the management server is configured to provide the updated safety event detection model to the at least one safety monitoring device, wherein the updated safety event detection model is configured to more accurately detect the safety event than the safety event detection model.

* * * * *